Nov. 2, 1965 E. J. KOCHER 3,215,193
LATENT HEAT STORAGE TANK
Filed Nov. 1, 1963 2 Sheets-Sheet 1
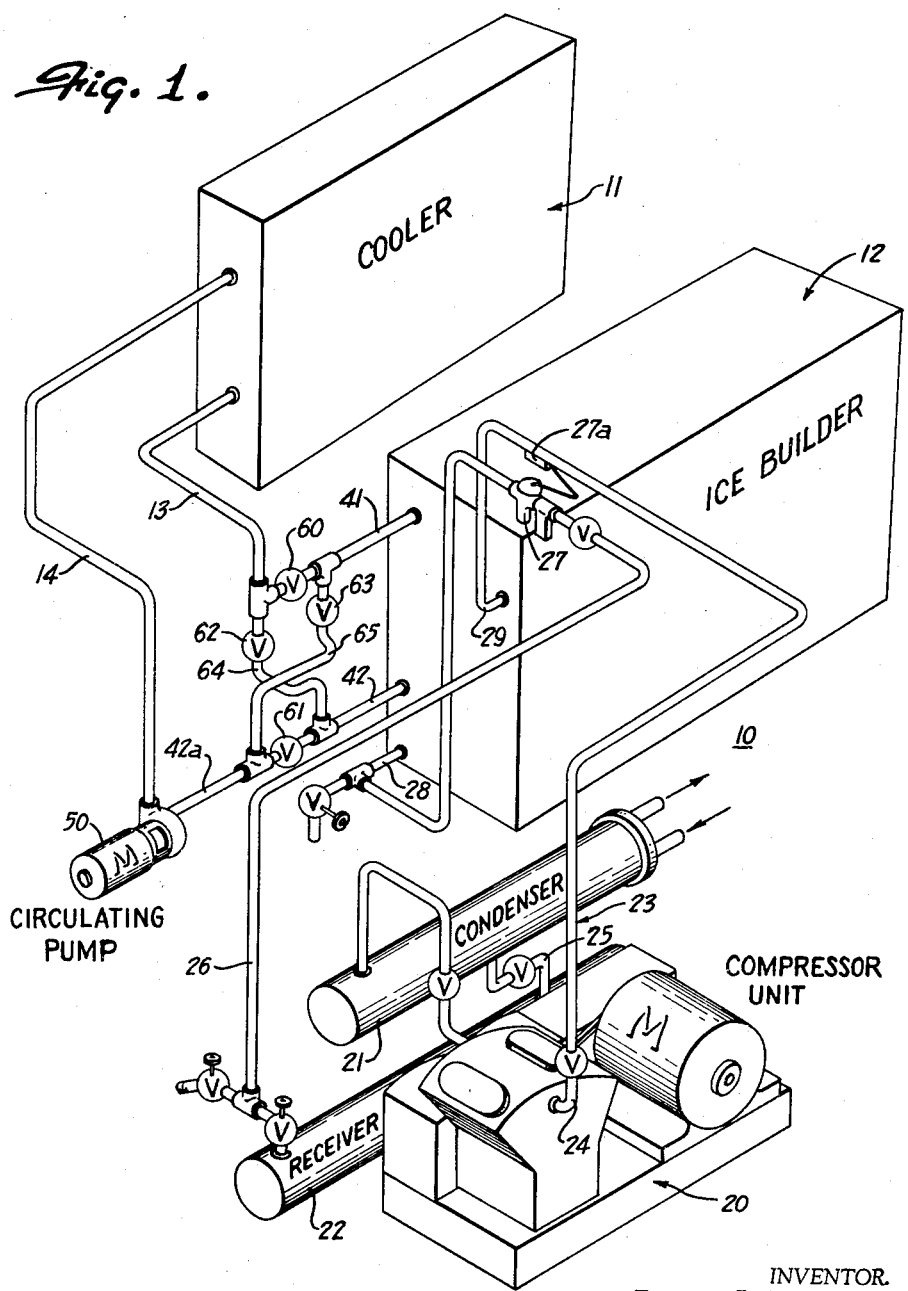
INVENTOR.
ERICH J. KOCHER
BY
Lieber & Nilles

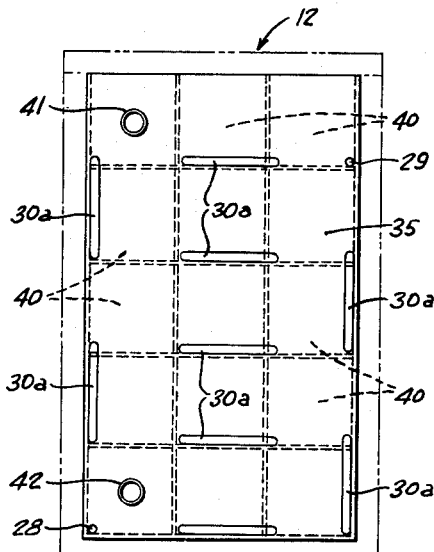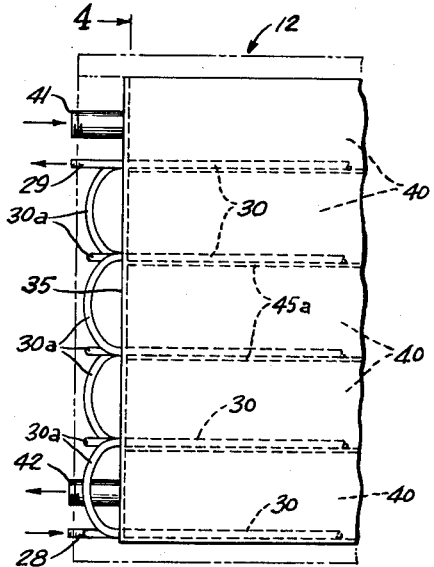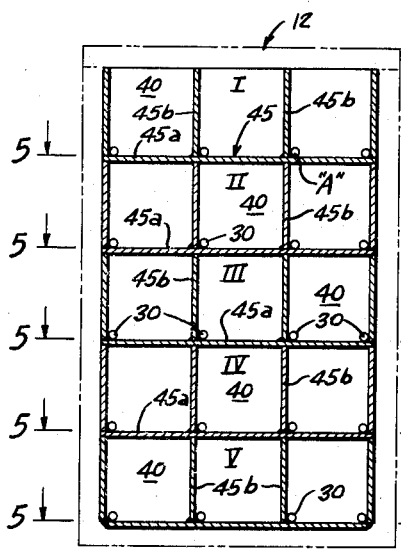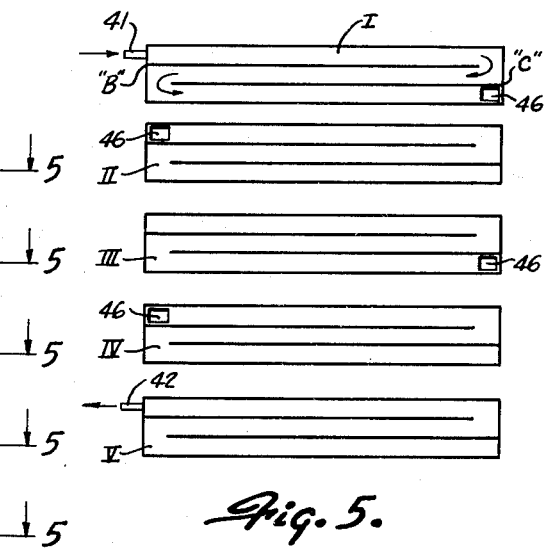

United States Patent Office 3,215,193
Patented Nov. 2, 1965

3,215,193
LATENT HEAT STORAGE TANK
Erich J. Kocher, Milwaukee, Wis., assignor to Vilter Manufacturing Corporation, Milwaukee, Wis., a corporation of Wisconsin
Filed Nov. 1, 1963, Ser. No. 320,776
3 Claims. (Cl. 165—164)

This invention relates to a fluid cooling system, and more particularly to a latent heat storage tank in said system wherein cooling is provided for a fluid flowing therethrough.

A primary object of the invention relates to an improved latent heat storage tank for use in a cooling system wherein said tank serves as an efficient heat transfer unit in building ice for cooling a fluid in said cooling system.

Prior art discloses refrigeration units for use in conjunction with coolers of cooling systems, as, for example, Morrison U.S. Patent No. 2,448,453. The ice building in this patent occurs in a tank having a series of flat, elongated, hollow plates through which a liquid refrigerant is conducted while water is circulated through the tank over the extensive surfaces of elongated, hollow plates. However, such construction of the tank and plates does not provide the desired amount of heat transfer and structural strength, and the patented device is objectionably difficult to maintain and repair.

The present invention provides a latent heat storage tank wherein the heat transfer surfaces or plates are an integral part of the construction of the tank itself and thus lend structural support thereto. The plates are constructed in such a way as to provide an extended path for the fluid to be cooled and are secured to the wall portions of the tank to increase tank rigidity thereby allowing a lighter weight, inexpensive material to be used for the tank walls.

Further, the refrigerant is conducted through the tank in conduits that are located adjacent the plates, and the conduits are provided with return bends which are located exteriorly of the tank to enable repair and replacement of such return bends without entering the interior of the tank. Such construction of the refrigerant conduits eliminates the need for welding return bends inside the tank, thus reducing the possibility of refrigerant conduit failure within the tank.

The plates within the tank are arranged in a grid-like fashion to provide a plurality of ice-forming chambers through which the fluid to be cooled is passed. Such grid-like construction enables the refrigerant conduit to be located on the plates of the grid, thereby eliminating any need for additional conduit support other than the plates themselves.

It is therefore an additional object of this invention to provide an improved storage tank for a cooling system which obviates the aforesaid disadvantages and objections of the prior devices.

Another object of the invention is to provide a latent heat storage tank of improved construction wherein efficient channeling of fluid therethrough facilitates construction and strength of said tank.

Still another object of this invention is to provide an improved ice builder cabinet or tank wherein maintenance of refrigerant conduits can easily and simply be performed exteriorly of the tank.

An additional object of this invention is to provide improved supporting structure for an ice builder cabinet or tank which also facilitates the support of refrigerant conduits or the like.

Another object of this invention is to provide improved refrigerant conduits that are easily and simply fabricated in the main, exteriorly of the tank.

These and other objects and advantages of the invention will become apparent from the following detailed description.

A clear conception of the several features constituting the present invention and the mode of constructing and operating an improved latent heat storage tank in a cooling system may be had by referring to the drawings accompanying and forming a part of this specification, wherein like reference characters designate the same or similar parts in the various views.

FIGURE 1 is a schematic, perspective view of a cooling system embodying the storage tank of the invention;

FIGURE 2 is an elevation of one end of the storage tank of FIGURE 1;

FIGURE 3 is a partial side elevation of the tank of FIGURES 1 and 2;

FIGURE 4 is a sectional view of the tank taken along line 4—4 of FIGURE 3; and

FIGURE 5 is a schematic, plan view of each of the tiers of the tank of FIGURE 4, taken along lines 5—5 of FIGURE 4.

While the improvements have been illustrated and described as being especially, advantageously embodied in a cooling system it is not intended to thereby unnecessarily limit or restrict the invention. It is also contemplated that certain descriptive terminology used herein shall be given the broadest possible interpretation consistent with the disclosure.

Referring now to FIGURE 1 of the drawings, a typical refrigerating system 10 which includes a cooler 11 and an ice building tank 12 is shown. Cooling water is circulated to and from cooler 11 and ice builder or tank 12 via conduits 13 and 14. The cooler 11 may contain the usual coils or the like (not shown) for circulating coolant or the like interiorly of the cooler or passed through the cooler. It is believed sufficient to disclose the cooler generally as 11, as the invention relates largely to the system and structure for providing a cooling fluid for communication with cooler 11 via the conduits 13, 14. Such a cooler may be a milk cooler, or the like, for example.

The refrigerating system 10 comprises a motor-compressor unit 20, a condenser 21, a refrigerant receiver 22, and an ice builder cabinet or tank 12 interconnected by appropriate conduits 23.

Refrigerant fluid enters compressor unit 20 at conduit 24 and is discharged at a higher pressure to the condenser 21. The refrigerant fluid flows to receiver 22 from the condenser via conduit 25. From the receiver, the refrigerant fluid is carried through conduit 26, thermostatic expansion valve 27 to inlet conduit 28 of the ice builder tank 12. Within tank 12, the refrigerant fluid passes through a series of coils 30 until the refrigerant fluid leaves the tank 12 at outlet conduit 29 to return to compressor suction conduit 24. Thus, a refrigerant system is described for supplying a refrigerant fluid to the ice builder cabinet or tank 12. It can further be seen that thermostatic expansion valve 27 in conduit 26 is actuated by a sensing means 27a located in tank outlet conduit 29 for maintaining a differential pressure in the refrigerant conduits in and out of said tank 12.

Reference will now be made to FIGURES 2, 3, and 4 for the interior construction of the ice builder cabinet or tank 12. The refrigerant fluid enters the tank at inlet conduit 28 and passes through a series of interconnected coils or tubes 30 and leaves the tank at outlet conduit 29. The coils or tubes 30 include return bends 30a located exteriorly of a wall 35 of the tank 12. Thus, refrigerant fluid in tubes 30 reaches every tank chamber 40 within the tank to cool any water admitted through water inlet 41 for discharge through water outlet 42.

The tank chambers 40 consist of metal plate members 45 which form a grid extending longitudinally of the tank 12 and are assembled in a manner to allow water to pass longitudinally along each plate member to a discharge opening 46 in each tier of chambers 40 as best disclosed in FIGURE 5. The entire tank 12 and grid assembly 45 are cooled by the refrigerant fluid flowing in conduits 30 of the tank. In the preferred embodiment, the tubes 30 are located at the welded junctures of the plate members 45 as at "A" in FIGURE 4.

The grid 45 may, for example, be constructed with four metal plates 45a extending longitudinally of the tank to divide the tank into five tiers I, II, III, IV, and V. The plates 45a which constitute the bottom of tiers I, II, III, and IV are provided with discharge openings 46 so that the water may flow from one tier to another, progressing downwardly of the tank, as viewed in the drawings. Inner grid plates 45b do not extend the full length of the tank, but rather are connected to the tank as at "B" and "C" to in effect create a baffle arrangement in each tier, so that, in the preferred embodiment, the water will travel three times the length of the tank in each tier before being discharged to the subjacent tier.

The grid 45 is thus easily assembled in the tank 12 and serves to brace the tank, enabling lighter and more economical material for the tank construction. Additionally, the grid 45 also serves to support the refrigerant tubes 30, thus simplifying the overall tank construction.

Regarding the tubes 30 and the return bends 30a, in the preferred embodiment the return bends are all located exteriorly of the tank 12 so that no welding is required of the tubes within the tank. This simplifies overall fabrication of the tank and facilitates the maintenance or replacement of return bends 30a.

In operation, the ice builder tank is filled with water, and the refrigerant fluid is admitted through conduit 28. As the refrigerant tubes 30 cool each tank chamber 40, ice will form on the metal grid 45. The ice is allowed to form to a desired thickness. The water is then circulated through the tank 12 and the cooler 11 by a pump 50. The water passing over the ice formed on the grid 45 will be cooled upon discharge from the tank, and the cool water will pass through cooler 11 to cool milk or the like within the cooler. The circulation of the water can be continuous at a slow rate to provide for continual ice formation and continued supply of cooled water for the cooler; or the system can be discontinuous to allow ice to build up, and then to allow water to flow through the tank for cooling and ice melting. When the ice deterioration reaches a predetermined point, the refrigerant fluid can again be passed through tubes 30 to produce icing conditions in chambers 40.

In the arrangement shown in FIG. 1, reversal of water flow through the ice builder is permitted. For example, with the valves 60 and 61 open and the valves 62 and 63 closed, the pump 50 will withdraw water from the bottom of tank 12 via conduit 42, 42a and will return it to the top of the tank 12 via conduits 14, 13 and 41. However, when valves 62 and 63 are open and valves 60 and 61 are closed, the pump 50 will withdraw water from the top of the tank 12 via conduits 41, 65 and 42a and will return it to the bottom of the tank 12 via conduits 14, 13, 64 and 42.

Thus, an improved ice builder cabinet or tank has been described wherein a metal plate grid arrangement forms not only a path for the fluid to be cooled and chambers for the building of ice, but in addition provides support for the refrigerant conduits and provides structural strength for the tank itself. Such a tank effectively carries out the desired heat transfer for the cooling system and is simple to construct, maintain, and operate.

Various modes of carrying out the invention are contemplated as being within the scope of the following claims particularly pointing out and distinctly claiming the subject matter which is regarded as the invention:

I claim:

1. A latent heat storage tank for a refrigerating system comprising, a main housing provided with a first inlet and a first outlet for fluid to be cooled and also provided with a second inlet and a second outlet for conducting refrigerant to and from said housing from the refrigerating system, a plurality of horizontal and vertical plate members secured together to form a grid interiorly of and in supporting relationship to said housing for reinforcing the same while providing a tortuous passageway for guiding the flow of fluid to be cooled from said first inlet to said first outlet, and a closed refrigerant conduit directly supported by the grid forming plate members along interconnecting corners thereof so as to abut both a horizontal and a vertical plate member and also extending in a tortuous path to connect said second inlet to said second outlet, the fluid to be cooled being guided through the tortuous passage formed by said grid interiorly of said housing from said first inlet to said first outlet for cooling by the action of refrigerant fluid circulating in said conduit.

2. A latent heat storage tank according to claim 1, wherein said closed refrigerant conduit includes a plurality of interconnecting return bends located exteriorly of said housing.

3. A latent heat storage tank according to claim 1, wherein both said horizontal and vertical plate members extend longitudinally of said housing and lie in parallel planes substantially parallel to the respective sides of said housing to form a grid having a plurality of horizontally and vertically disposed interconnected chambers providing the tortuous passage within said housing extending from the first inlet to the first outlet.

References Cited by the Examiner

UNITED STATES PATENTS

| | | | |
|---|---|---|---|
| 2,160,333 | 5/39 | Johnston | 62—434 X |
| 2,221,423 | 11/40 | Reinhardt | 62—394 |
| 2,571,923 | 10/51 | Morrison | 62—434 |
| 2,858,677 | 11/58 | Stone | 62—434 |

CHARLES SUKALO, *Primary Examiner.*

ROBERT A. O'LEARY, *Examiner.*